United States Patent
Cao et al.

(10) Patent No.: US 10,685,426 B2
(45) Date of Patent: Jun. 16, 2020

(54) SYSTEM AND METHOD FOR ADAPTIVE PANORAMIC IMAGE GENERATION

(71) Applicant: SZ DJI TECHNOLOGY CO., LTD., Shenzhen (CN)

(72) Inventors: Zisheng Cao, Shenzhen (CN); Zhanli Zhang, Shenzhen (CN); Junjie Chen, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 99 days.

(21) Appl. No.: 15/699,131

(22) Filed: Sep. 8, 2017

(65) Prior Publication Data

US 2018/0012336 A1 Jan. 11, 2018

Related U.S. Application Data

(63) Continuation of application No. PCT/CN2015/073916, filed on Mar. 10, 2015.

(51) Int. Cl.
*G06T 3/40* (2006.01)
*H04N 5/232* (2006.01)
(Continued)

(52) U.S. Cl.
CPC ............. *G06T 3/4038* (2013.01); *G06T 7/32* (2017.01); *H04N 5/23238* (2013.01);
(Continued)

(58) Field of Classification Search
CPC ..... G06T 3/4038; G06T 7/32; G06T 2200/32; G06T 2207/10032; G06T 2207/20221; H04N 5/23238; H04N 5/2624
See application file for complete search history.

(56) References Cited

U.S. PATENT DOCUMENTS 6,618,511 B1 * 9/2003 Mancuso ............... G06T 3/4038
348/218.1
9,208,668 B1 * 12/2015 Wu ........................ H04N 7/181
(Continued)

FOREIGN PATENT DOCUMENTS

CN 101867720 A 10/2010
CN 103279939 A 9/2013
(Continued)

OTHER PUBLICATIONS

The World Intellectual Property Organization (WIPO) International Search Report and Written Opinion for PCT/CN2015/073916 dated Nov. 6, 2015 8 Pages.

*Primary Examiner* — Mulugeta Mengesha
*Assistant Examiner* — Alazar Tilahun
(74) *Attorney, Agent, or Firm* — Anova Law Group, PLLC

(57) ABSTRACT

An imaging system for adaptively generating panoramic images and methods for manufacturing and using same are provided. The system includes an imaging device configured to capture digital images at a plurality of image capture positions. The system further includes a processor configured to identify an overlapping portion of first and second images captured at respective first and second image capture positions, determine a stitching position quality measure for a plurality of stitching positions in the overlapping portion of the first and second images, and select a stitching position based on the determined stitching position quality measures of the plurality of stitching positions of the first and second images. The processor is also configured to stitch the first and second images together at the selected stitching position to generate a panoramic image and determine a third image capture position based on the stitching position quality measure.

16 Claims, 8 Drawing Sheets

(51) Int. Cl.
*G06T 7/32* (2017.01)
*H04N 5/262* (2006.01)
(52) U.S. Cl.
CPC ....... *H04N 5/2624* (2013.01); *G06T 2200/32* (2013.01); *G06T 2207/10032* (2013.01); *G06T 2207/20221* (2013.01)

(56) References Cited

U.S. PATENT DOCUMENTS

| | | | |
|---|---|---|---|
| 2009/0022419 | A1 | 1/2009 | Molnar et al. |
| 2012/0183204 | A1* | 7/2012 | Aarts .................... G06T 15/205 382/154 |
| 2012/0263397 | A1* | 10/2012 | Kimura .............. H04N 5/23238 382/284 |
| 2014/0210940 | A1* | 7/2014 | Barnes ............... H04N 5/23293 348/36 |
| 2014/0307045 | A1 | 10/2014 | Richardt et al. |
| 2014/0375760 | A1* | 12/2014 | Lee .................... H04N 5/23238 348/36 |
| 2015/0189175 | A1* | 7/2015 | Fan ...................... H04N 5/2251 348/37 |

FOREIGN PATENT DOCUMENTS

| | | |
|---|---|---|
| CN | 103618881 A | 3/2014 |
| CN | 103679674 A | 3/2014 |
| CN | 103763479 A | 4/2014 |
| CN | 104376548 A | 2/2015 |

\* cited by examiner

SYSTEM AND METHOD FOR ADAPTIVE PANORAMIC IMAGE GENERATION

CROSS-REFERENCE TO RELATED APPLICATION

This is a continuation application of International Application No. PCT/CN2015/073916, filed on Mar. 10, 2015, the entire contents of which are incorporated herein by reference.

FIELD

The present disclosure relates to single-lens panoramic data acquisition, and more specifically, but not exclusively, to systems and methods for adaptive panoramic image generation.

BACKGROUND

Many digital camera and smart-phone devices now have panoramic image capture modes, but shooting in these modes still requires manual turning of the devices. Moreover, users can only generate quality images by operating within strict parameters related to image capture speed and level status of the camera.

During panoramic image acquisition, the camera needs to turn a full circle and capture a series of overlapping images at a plurality of image capture positions. These images are then stitched together to form a single continuous panoramic image. Depending on the content of the images being stitched together, and the amount of overlap in sequential images, it may be difficult to find a suitable stitching location for the images.

One solution is to take many images and have large overlap between images, but this results in undesirably slow image capturing and processing. Accordingly, there is a need in the art for dynamic image capturing of panoramic images that minimizes image capture and processing time, while also maximizing the stitching quality of successive images.

In view of the foregoing, a need exists for an improved imaging system and method for adaptive panoramic image generation in an effort to overcome the aforementioned obstacles and deficiencies of conventional panoramic imaging systems and methods.

SUMMARY

One aspect includes an image generating system that includes an imaging device configured to capture digital images at a plurality of image capture positions and a processor operably coupled with the imaging device, the processor configured to: determine a stitching position quality measure for a plurality of stitching positions in an overlapping portion of a first and second image, wherein the first image is captured at a first image capture position, and wherein the second image is captured at a second image capture position.

In one embodiment, the processor is also configured to select a first stitching position based on the determined stitching position quality measures of the plurality of stitching positions of the first and second image; and stitch the first and second image together at the selected first stitching position to generate a first panoramic image. In another embodiment, the processor is also configured to determine a third image capture position based on the stitching position quality measure of the first selected stitching position.

In a further embodiment, selecting a first stitching position includes dividing the overlapping portion into smaller portions; calculating a joint sum of squared differences for each smaller portion; selecting one of the smaller portions having a least joint sum; and selecting from the selected smaller portion a stitching position having a minimal combined pixel and gradient least-sum-of-squared differences, with a minimum sum of squared difference used to select the stitching position.

In a still further embodiment, the controller is configured to generate control instructions and send the control instructions to a motion controller of a moving platform on which the imaging device is positioned, and the control instructions are used by the motion controller to move the imaging device from the first image capture position to the second image capture position, or from the second image capture position to the third image capture position.

In another embodiment, the processor is also configured to identify the overlapping portion of the first image and the second image. A further embodiment includes a control module configured to move the imaging device from the first image capture position to the second image capture position and from the second image capture position to the third image capture position In a still further embodiment, the controller is configured to rotate the imaging device about a predetermined axis central to the first, second and third image capture positions. In one embodiment, the controller is configured to move the imaging device along the circumference of a circle. In another embodiment, the imaging device is positioned on a gimbal.

In a further embodiment, the system is positioned on a moving platform. In a still further embodiment, the moving platform comprises an aerial vehicle. In yet another embodiment, the system is configured to wirelessly communicate a generated panoramic image to a user device.

In one embodiment, the processor is further configured to: receive a third image captured at the third image capture position; identify an overlapping portion of the first panoramic image and the third image; determine a stitching position quality measure for a plurality of stitching positions in the overlapping portion of the first panoramic image and the third image; select a second stitching position based on the determined stitching position quality measures of the plurality of stitching positions of the first panoramic image and the third image; stitch the first panoramic image and third image together at the second selected stitching position to generate a second panoramic image; and determine a fourth image capture position based on the stitching position quality measure of the selected stitching position used to generate the second panoramic image.

In another embodiment, the stitching position is a vertical line. In a further embodiment, a FAST algorithm is used for corner detection in the first and second image to identify one or more special characteristic point. In a still further embodiment, a BRIEF algorithm is used to identify feature descriptors of the first and second image.

In one embodiment, a Hamming distance between identified descriptors of the first and second images is used to identify the overlapping portion of the first and second image. In another embodiment, a stitching position is selected based on a combined minimal pixel and gradient least-sum-of-squares calculation. In a further embodiment, the imaging device comprises a red-green-blue (RGB) sensing camera. In a still further embodiment, the processor is further configured to determine whether the stitching position quality measure of the first selected stitching position is greater than or less than a threshold.

In one embodiment, the threshold comprises a range of values. In another embodiment, the threshold is a single value. In a further embodiment, the distance between the first and second image capture positions is defined by a default angle, wherein the angle between the second and third image capture positions is defined by a second angle, and wherein determining the third image capture position comprises determining the second angle.

In one embodiment, an angle greater than the default angle is selected for the second angle if the quality measure of the first selected stitching position is less than the threshold. In another embodiment, an angle less than the default angle is selected for the second angle if the quality measure of the first selected stitching position is greater than the threshold. In a further embodiment, an angle equal to the default angle is selected for the second angle if the quality measure of the first selected stitching position is not greater than the threshold and not less than the threshold.

Another aspect includes a method for adaptive panoramic image generation, including determining a stitching position quality measure for a plurality of stitching positions in an overlapping portion of a first image captured at a first image capture position and a second image captured at a second image capture position.

In one embodiment, the method also includes selecting a first stitching position based on the determined stitching position quality measures of the plurality of stitching positions of the first and second image, and stitching the first and second image together at the selected first stitching position to generate a first panoramic image. Another embodiment includes determining a third image capture position based on the stitching position quality measure of the first selected stitching position. A further embodiment comprises generating a panoramic image by determining a third image capture position based on the stitching position quality measure of the first selected stitching position.

In another embodiment, the method also includes identifying an overlapping portion of a first image captured at a first image capture position and a second image captured at a second image capture position. In a further embodiment the method also includes obtaining, by an imaging device, the first image captured at the first image capture position.

In a still further embodiment, the method also includes moving the imaging device to the second image capture position; and obtaining, by the imaging device, the second image captured at the second image capture position.

In one embodiment, the method also includes moving the imaging device to the third image capture position. In another embodiment, the method includes generating control instructions and sending the control instructions to a motion controller of a moving platform on which the imaging device is positioned, wherein the control instructions are used by the motion controller to move the imaging device from the first image capture position to the second image capture position, or from the second image capture position to the third image capture position.

In another embodiment, moving the imaging device to a second image capture position comprises rotating the imaging device about an axis. In a further embodiment, moving the imaging device to a second image capture position comprises moving the imaging device about the circumference of a circle. In a still further embodiment, moving the imaging device to the second image capture position comprises moving the imaging device on a gimbal.

In one embodiment, moving the imaging device to the second image capture position comprises moving a moving platform. In another embodiment, moving platform comprises an aerial vehicle. In a still further embodiment, the method also includes wirelessly communicating a generated panoramic image to a user device.

In one embodiment, the method also includes obtaining, by the imaging device, a third image captured at a third image capture position; identifying an overlapping portion of the first panoramic image and the third image; determining a stitching position quality measure for a plurality of stitching positions in the overlapping portion of the first panoramic image and the third image; selecting a second stitching position based on the determined stitching position quality measures of the plurality of stitching positions of the first panoramic image and the third image; stitching the panoramic image and the third image together at the second selected stitching position to generate a second panoramic image; and determining a fourth image capture position based on the stitching position quality measure of the selected stitching position used to generate the second panoramic image.

In another embodiment, the stitching position is a vertical line. In a further embodiment, the method also includes using a FAST algorithm for corner detection in the first and second image to identify one or more special characteristic point. In a still further embodiment, the method also includes using a BRIEF algorithm to identify feature descriptors of the first and second image.

In one embodiment, the method also includes using a Hamming distance between identified descriptors of the first and second images to identify the overlapping portion of the first and second image. In another embodiment, the method also includes, selecting the first stitching position based on a combined minimal pixel and gradient least-sum-of-squares calculation. In a further embodiment, the imaging device comprises an RGB camera.

In one embodiment, the method also includes determining if the stitching position quality measure of the first selected stitching position is greater than or less than a threshold. In another embodiment, the threshold comprises a range of values. In a further embodiment, the threshold is a single value.

In one embodiment, a distance between the first and second image capture positions is defined by a default angle; wherein the angle between the second and third image capture positions is defined by a second angle, and wherein determining the third image capture position comprises determining the second angle.

In another embodiment, the method also includes selecting an angle greater than the default angle, for the second angle, if the quality measure of the first selected stitching position is less than the threshold. In a further embodiment, the method also includes selecting an angle less than the default angle, for the second angle, if the quality measure of the first selected stitching position is greater than the threshold. In a still further embodiment, the method also includes selecting an angle equal to the default angle, for the second angle, if the quality measure of the first selected stitching position is not greater than the threshold and not less than the threshold.

Another aspect includes a processor configured to determine a stitching position quality measure for a plurality of stitching positions in an overlapping portion of a first and second image, wherein the first image is captured at a first image capture position, and wherein the second image is captured at a second image capture position.

In one embodiment, the processor is further configured to select a first stitching position based on the determined stitching position quality measures of the plurality of stitching positions of the first and second image and stitch the first and second image together at the selected first stitching position to generate a first panoramic image.

In another embodiment, the processor is further configured to determine a third image capture position based on the stitching position quality measure of the first selected stitching position. In a further embodiment, the processor is further configured to generate a panoramic image by determining a third image capture position based on the stitching position quality measure of the first selected stitching position.

In one embodiment, the processor is further configured to divide the overlapping portion into smaller portions; calculate a joint sum of squared differences for each smaller portion; select one of the smaller portions having a least joint sum; and select from the selected smaller portion a stitching position having a minimal combined pixel and gradient least-sum-of-squared differences, with a minimum sum of squared difference used to select the stitching position.

In another embodiment, the processor is further configured to identify an overlapping portion of a first image captured at a first image capture position and a second image captured at a second image capture position.

In a further embodiment, the processor is further configured to obtain, by an imaging device, the first image captured at the first image capture position. In a still further embodiment, the processor is further configured to move the imaging device to the second image capture position and obtain, by the imaging device, the second image captured at the second image capture position. In yet another embodiment, the processor is further configured to move the imaging device to the third image capture position.

In one embodiment, the processor is further configured to generate control instructions and send the control instructions to a motion controller of a moving platform on which the imaging device is positioned, wherein the control instructions are used by the motion controller to move the imaging device from the first image capture position to the second image capture position, or from the second image capture position to the third image capture position.

In another embodiment, the processor is further configured to move the imaging device to a second image capture position by rotating the imaging device about an axis. In a further embodiment, the processor is further configured to move the imaging device to a second image capture position by moving the imaging device about the circumference of a circle.

In a further embodiment, the processor is further configured to move the imaging device to the second image capture position by moving the imaging device on a gimbal. In a still further embodiment, the processor is further configured to move the imaging device to the second image capture position by moving a moving platform.

In one embodiment, the moving platform comprises an aerial vehicle. In another embodiment, the processor is further configured to wirelessly communicate a generated panoramic image to a user device. In a further embodiment, the processor is further configured to obtain, by the imaging device, a third image captured at a third image capture position; identify an overlapping portion of the first panoramic image and the third image; determine a stitching position quality measure for a plurality of stitching positions in the overlapping portion of the first panoramic image and the third image; select a second stitching position based on the determined stitching position quality measures of the plurality of stitching positions of the first panoramic image and the third image; stitch the panoramic image and the third image together at the second selected stitching position to generate a second panoramic image; and determine a fourth image capture position based on the stitching position quality measure of the selected stitching position used to generate the second panoramic image.

In one embodiment, the stitching position is a vertical line. In another embodiment, the processor is further configured to use a FAST algorithm for corner detection in the first and second image to identify one or more special characteristic point. In another embodiment, the processor is further configured to use a BRIEF algorithm to identify feature descriptors of the first and second image.

In a further embodiment, the processor is further configured to use a Hamming distance between identified descriptors of the first and second images to identify the overlapping portion of the first and second image. In yet another embodiment, the processor is further configured to select the first stitching position based on a combined minimal pixel and gradient least-sum-of-squares calculation.

In one embodiment, the imaging device comprises an RGB camera. In another embodiment, the processor is further configured to determine if the stitching position quality measure of the first selected stitching position is greater than or less than a threshold. In a further embodiment, the threshold comprises a range of values. In a still further embodiment, the threshold is a single value.

In one embodiment, a distance between the first and second image capture positions is defined by a default angle, wherein the angle between the second and third image capture positions is defined by a second angle, and wherein determining the third image capture position comprises determining the second angle.

In another embodiment, the processor is further configured to select an angle greater than the default angle, for the second angle, if the quality measure of the first selected stitching position is less than the threshold. In a further embodiment, the processor is further configured to select an angle less than the default angle, for the second angle, if the quality measure of the first selected stitching position is greater than the threshold. In a further embodiment, the processor is further configured to select an angle equal to the default angle, for the second angle, if the quality measure of the first selected stitching position is not greater than the threshold and not less than the threshold.

One aspect includes an apparatus that comprises an image sensor and a processor in accordance with any one the embodiment discussed above.

Another aspect includes a computer program product for adaptive panoramic image generation, the computer program product being encoded on one or more machine-readable storage media and comprising instruction for executing the methods described above. A further aspect includes computer program product, wherein the adaptive panoramic image generation methods described above are provided as a series of instructions stored on non-transitory storage medium.

A still further aspect includes a computer program product for adaptive panoramic image generation, the computer program product being encoded on non-transitory machine-readable storage media and comprising: instruction for identifying, by a computer, an overlapping portion of a first image captured at a first image capture position and a second image captured at a second image capture position; instruction for determining, by the computer, a stitching position quality measure for a plurality of stitching positions in the overlapping portion of the first and second image; instruction for selecting, by the computer, a first stitching position based on the determined stitching position quality measures of the plurality of stitching positions of the first and second image; instruction for stitching, by the computer, the first and second image together at the selected first stitching position to generate a first panoramic image; and instruction for determining, by the computer, a third image capture position based on the stitching position quality measure of the first selected stitching position.

Figure 1:
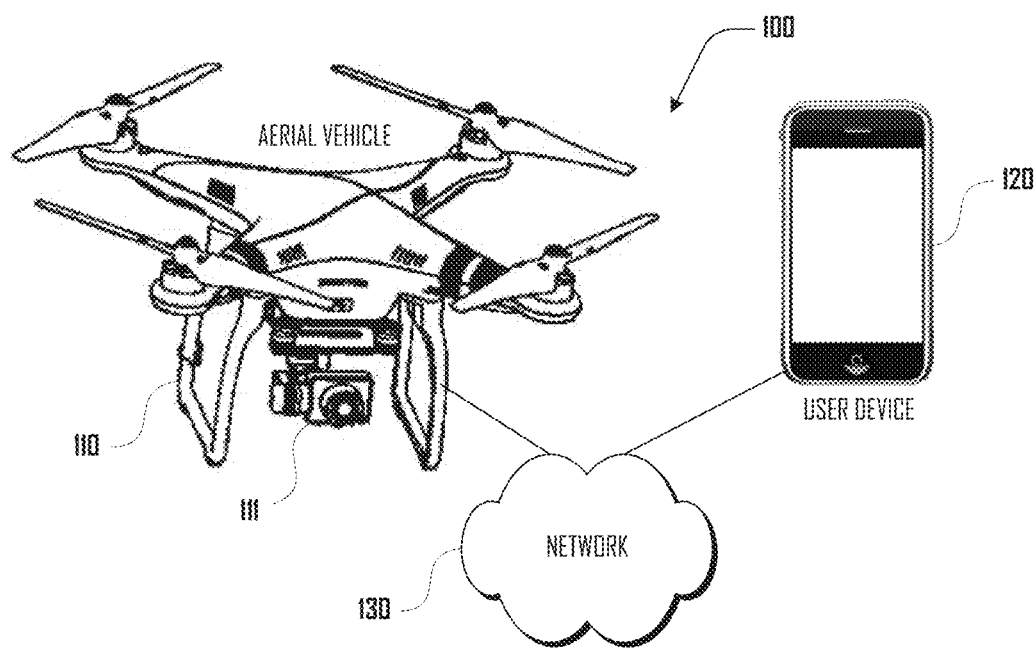
FIG. 1 is an exemplary network diagram illustrating an embodiment of a panoramic imaging system including an aerial vehicle.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available panoramic imaging systems and methods are not capable of optimizing image capture by maximizing speed without sacrificing quality, an imaging system that provides for adaptive generation of panoramic images can prove desirable and provide a basis for a wide range of imaging applications, such as aerial photography. This result can be achieved, according to one embodiment disclosed herein, by a panoramic imaging system 100 as illustrated in FIG. 1.

Turning to FIG. 1, the panoramic imaging system 100 is shown as comprising an aerial vehicle 110 and a user device 120 that are operably connected via a network 130. The aerial vehicle 110 is depicted as a quadcopter; however, any suitable type of aerial vehicle can be used in further embodiments, including rotor-based aerial vehicles, airplanes, jets, balloons, gliders, or the like. Additionally, an aerial vehicle 110 can be any suitable size including both large and small aerial vehicles. Additionally, in further embodiments, the systems and methods described herein can be applied to any conventional type of moving platforms such as non-aerial vehicles and/or can be applied to any suitable type of imaging system, including a digital camera, smartphone, headset computer, gaming device, laptop computer, tablet computer, and the like.

The aerial vehicle 110 is depicted as comprising an imaging device 111, which in various embodiments can be any type of suitable digital RGB camera, or the like. In some embodiments, an imaging device 111 can be a video camera, smartphone, webcam, three-dimensional camera, infrared camera, or the like. The imaging device 111 can be removably coupled to the aerial vehicle 110 or can be at least partially integrated with the aerial vehicle 110.

Figure 2:
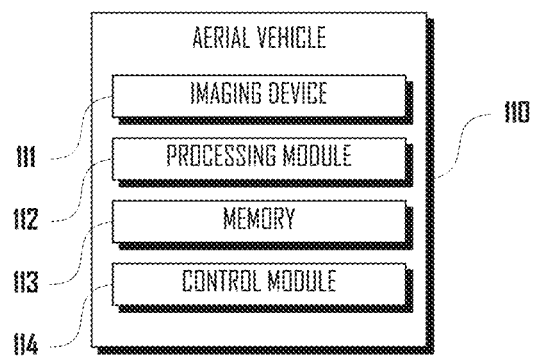
FIG. 2 is an exemplary block diagram illustrating an embodiment of the aerial vehicle of FIG. 1.

FIG. 2 is a block diagram of an exemplary embodiment of an aerial vehicle 110, which is shown including the imaging device 111, a processing module 112, a memory 113 and a control module 114. As discussed in more detail herein, components 111, 112, 113, 114 can be suitably configured to perform various methods of generating and sending panoramic images. In some embodiments, the panoramic imaging system 100 can include a plurality of aerial vehicles 110.

Returning to FIG. 1, the user device 120 is depicted as a smartphone, but, in further embodiments, the user device 120 can be any suitable device, including a laptop computer, headset computer, tablet computer, gaming device, or the like. In some embodiments, the panoramic imaging system 100 can include a plurality of user devices 120, or the user device 120 can be absent.

In various embodiments, the network 130 can comprise any suitable wired or wireless network, including a WiFi network, a Bluetooth Network, a Local Area Network (LAN), a wide area network (WAN), a cellular network, a short message service (SMS) network, a satellite network, the Internet, or the like. As discussed in more detail herein, the aerial vehicle 110 can be configured to generate a panoramic image from a plurality of images and communicate a generated panoramic image to the user device 120, which can be configured to display the panoramic image.

Figure 3:
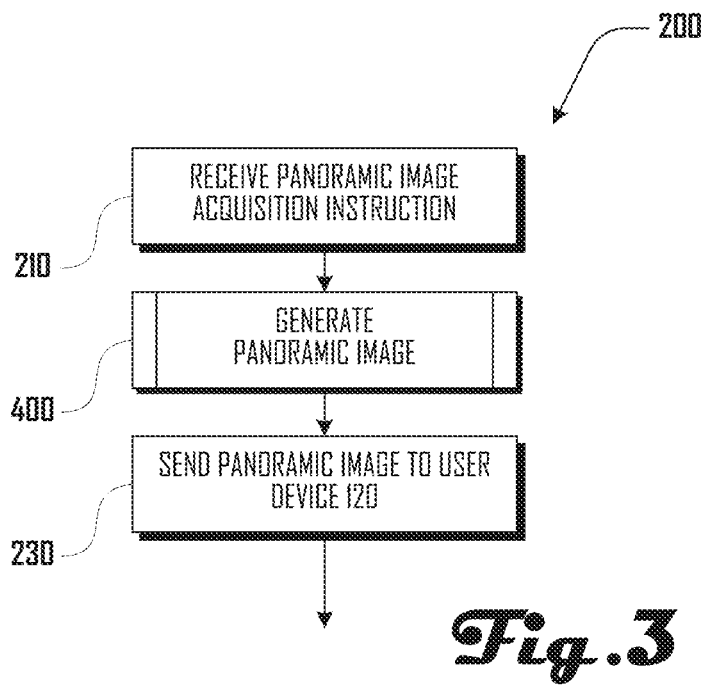
FIG. 3 is an exemplary flow chart illustrating an embodiment of a method of generating and sending a panoramic image.

FIG. 3 is an exemplary flow chart illustrating an embodiment of a method 200 for generating and sending a panoramic image. The method 200 begins in block 210, where a panoramic image acquisition instruction is received, and, in sub-method block 400, a panoramic image is generated. In block 230, the generated panoramic image is sent to the user device 120. For example, in one embodiment, the user device 120 can send an image acquisition instruction to the aerial vehicle 110, and the aerial vehicle 110 can generate a panoramic image as discussed in further detail herein. The generated panoramic image can be sent from the aerial vehicle 110 to the user device 120, where the panoramic image can be displayed, processed or otherwise used in any desirable way.

In various embodiments, a panoramic image acquisition instruction can be received from the user device 120, but, in further embodiments, the panoramic image acquisition instruction can be received from the aerial vehicle 110. For example, the aerial vehicle 110 can generate such an instruction based on a timer or based on certain criteria including identified objects, environmental conditions, or the like. In embodiments where the user device 120 sends the panoramic image acquisition instruction, the generated panoramic image can be sent to the same user device 120 and/or to one or more other user devices 120.

Figure 4:
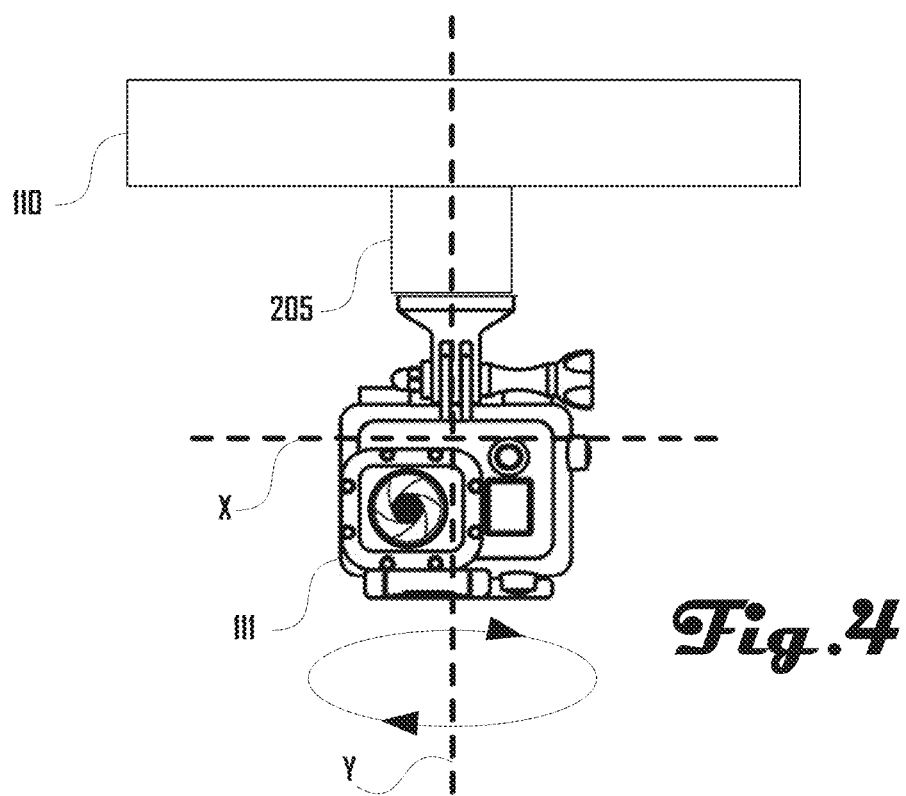
FIG. 4 is an exemplary illustration of axes associated with an imaging device positioned on the aerial vehicle of FIG. 1.

In various embodiments, the aerial vehicle 110 is operable to generate a panoramic image by capturing a series of images during rotation or other movement of the imaging device 111 and stitching the captured images together to form a panoramic image. For example, referring to FIG. 4, the imaging device 111 can capture a plurality of images as the imaging device 111 rotates around a Y-axis. In some embodiments, it can be desirable to substantially limit rotation or movement to a single axis to generate enhanced uniformity of the images captured during rotation. For example, if images are captured by rotation about the Y-axis as depicted in FIG. 4, movement can be suppressed about other axes such as the X-axis, or the like.

Rotation of the imaging device 111 can occur by rotation of the aerial vehicle 110 as a whole and/or by rotation of specific portions of the aerial vehicle 110. For example, the imaging device 111 can be positioned on a gimbal 205, shaft or other device, which can move, turn, or rotate the imaging device 111 independently of any motion by the aerial vehicle 110. Rotation and/or rotation increments can include any suitable amount of rotation including 1°, 2°, 3°, 4°, 5°, 45°, 90°, 180°, 270°, 360°, 450°, 540°, 720°, 3600°, or the like. Additionally, rotation to capture images can occur along any preselected axis (e.g., the X-axis), or rotation, movement, or translation of the imaging device 111 can occur along a non-uniform path.

Figure 5:
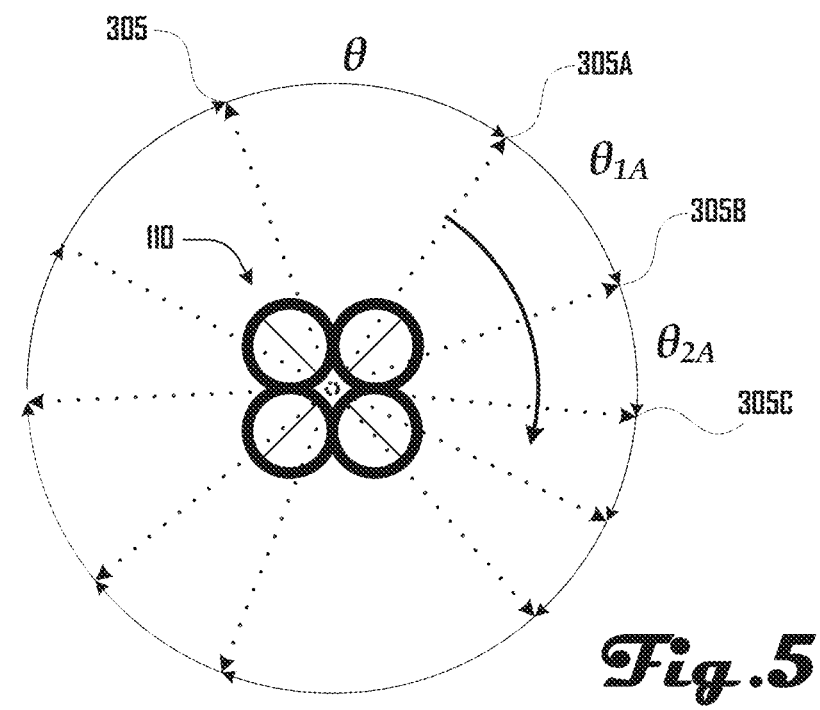
FIG. 5 illustrates movement of the aerial vehicle of FIG. 1 in an image capture sequence defined by a plurality of image capture positions.

For example, as depicted in FIG. 5, the aerial vehicle 110 can rotate in a circle and capture a plurality of images at various image capture locations 305. In other words, the imaging device 111 can take an image at a first image capture location 305A, and the aerial vehicle 110 can rotate an amount of $\theta_{1A}$ to a second image capture location 305B, where a second image is captured by the imaging device 111. The aerial vehicle 110 can rotate an amount of $\theta_{2A}$ to a third image capture location 305C, where a third image is captured by the imaging device 111.

Figure 6:
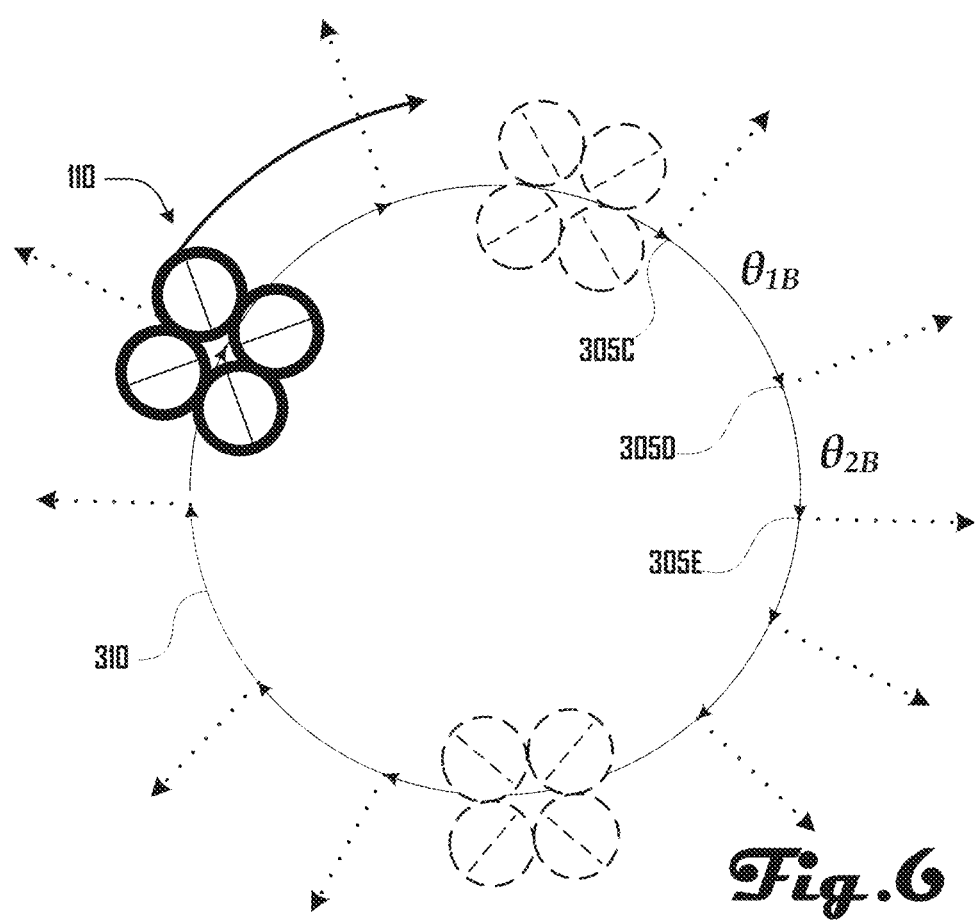
FIG. 6 illustrates movement of the aerial vehicle of FIG. 1 in another image capture sequence defined by a plurality of image capture positions.

Additionally and/or alternatively, as illustrated in FIG. 6, the aerial vehicle 110 can move in a substantially circular flight pattern 310, along the circumference of a circle, and capture images at image capture locations 305 substantially perpendicular to a tangent of the circular flight pattern 310. In other words, the imaging device 111 can take an image at a first image capture location 305C, and the aerial vehicle 110 can move an amount of $\theta_{1B}$ to a second image capture location 305D along circular flight pattern 310, where a second image is captured by the imaging device 111. The aerial vehicle 110 can move an amount of $\theta_{2B}$ to a third image capture location 305E along circular flight pattern 310, where a third image is captured by the imaging device 111.

In various embodiments, rotation angle θ between adjacent image capture locations 305 can be uniform and/or non-uniform, and image capture locations 305 and rotation angle θ can be determined as described in more detail herein by identifying desirable image stitching locations and for panoramic images and desirable overlap for images being stitched into a panoramic image. Additionally, although FIGS. 5 and 6 illustrate circular image capturing flight patterns, any other suitable flight pattern can be used to capture a plurality of images, including a rectangle, oval, line or an irregular shape. Additionally, flight patterns can vary in height and need not be limited to a single plane.

Figure 7:
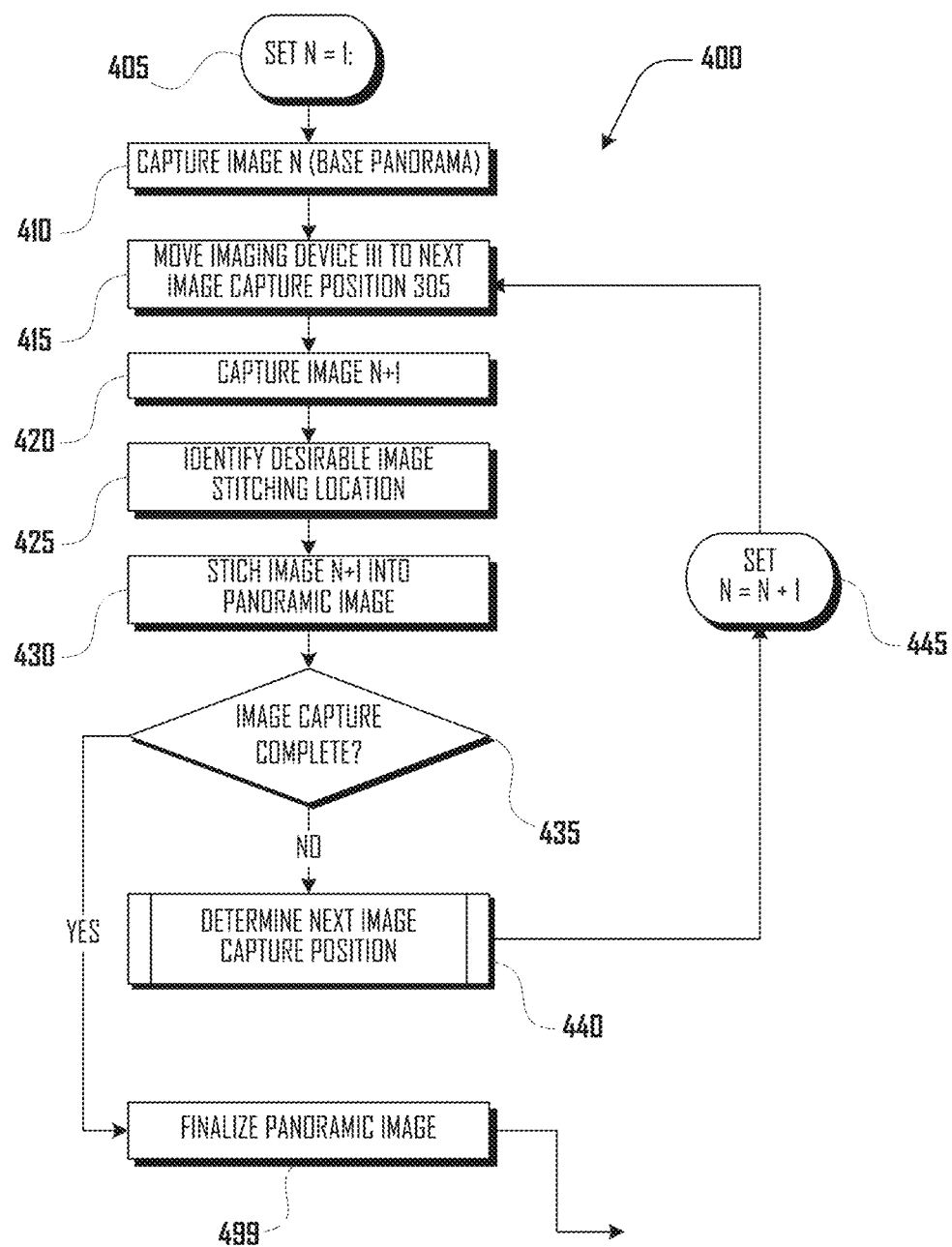
FIG. 7 is an exemplary flow chart illustrating an embodiment of a method of generating a panoramic image.

FIG. 7 is an exemplary flow chart illustrating an embodiment of a method 400 for generating a panoramic image. The method 400 begins, at 405, where variable N is set to 1. At block 410, image N is captured, and, at block 415, the imaging device 111 moves to the next image capturing position 305. For example, moving can include rotating and/or moving in a circular pattern as shown and described in more detail above with reference to FIGS. 5 and/or 6.

Figure 9:
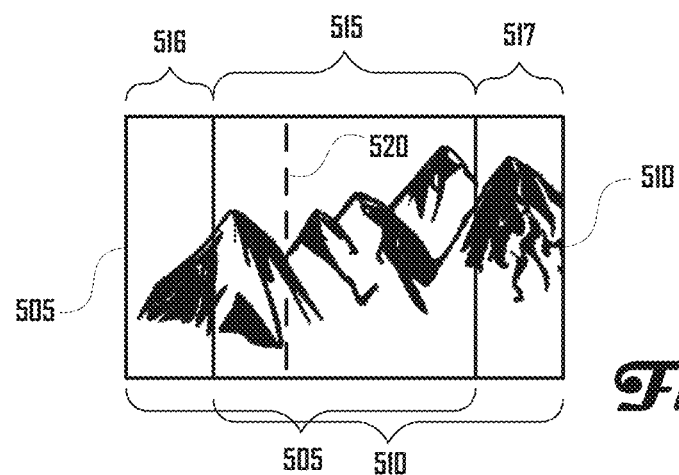
FIG. 9 illustrates an overlapping portion of the exemplary first and second images of FIG. 8 and a selected stitching position within the overlapping portion.
Figure 10:
FIG. 10 illustrates an exemplary panoramic image generated by stitching together the exemplary first and second images of FIG. 8.

At block 420, image N+1 is captured, and, at block 425, a desirable image stitching location is identified. At block 430, image N+1 is stitched into the current panoramic image. For example, with N initially at 1, the first image captured is image 1, and the next image (N+1) captured is image 2. Image 1 is the base panorama image so images 1 and 2 are therefore stitched together into a panoramic image. Such stitching is illustrated in FIGS. 8-10.

The method 400 continues, to decision block 435, where a determination is made whether image capture is complete. If so, the panoramic image is finalized, in block 499. However, if image capture is not complete, then the next image capture position is determined, at block 440, as discussed in more detail herein. At 445, variable N is set to N+1 and the method 400 cycles back to block 415.

Figure 8:
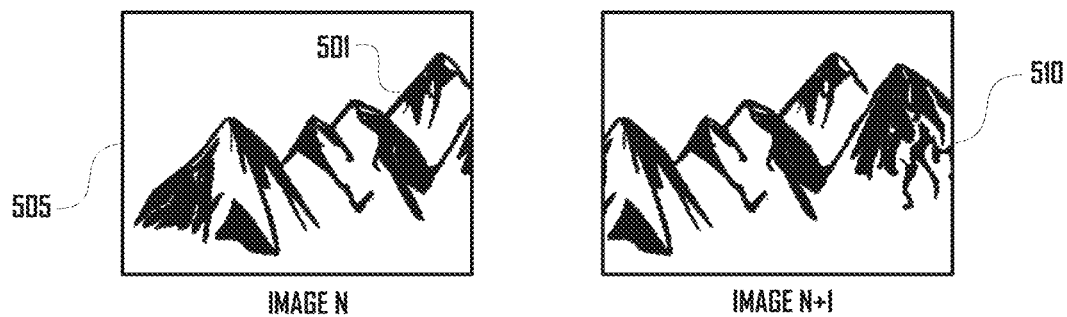
FIG. 8 illustrates exemplary first and second images used to ultimately generate a panoramic image.

FIG. 8 depicts a first and second image 505, 510 that both include mountains 501. In this example, the first image 505 was captured by an imaging device 111 (shown in FIG. 1) at a first image capture position 305 (shown in FIGS. 5 and 6), and the imaging device 111 was moved or rotated to a second image capture position 305 where the second image 510 was captured. This is evident given that the first and second image 505, 510 include an overlapping portion 515, with portions 516, 517 of the respective images 505, 510 that are non-overlapping as depicted in FIG. 9. Given that the images 505, 510 have an overlapping portion, the images can be stitched together to form a contiguous panoramic image 530 as depicted in FIG. 10.

To stitch the images 505, 510 together, the overlapping portion 515 can be identified, and a portion of the substantially redundant overlapping portions can be removed and/or combined. For example, referring to FIG. 9, a stitching position 520 can be identified and/or determined that is within the overlapping portion 515. In some embodiments, portions of the second image 510 to the left of the stitching line 520 can be removed, and portions of the first image 505 to the right of the stitching line 520 can be removed to generate a contiguous panoramic image 530. In other words panoramic image 530 can be generated by combining the remaining portions of the first and second image 505, 510 at the stitching line 520. In various embodiments, any suitable image stitching can occur about a stitching line 520. For example, portions of the first and second image 505, 510 proximate to the stitching line can be averaged, combined or otherwise merged to form a single image. In further embodiments, images can be stitched along a line that is not perpendicular to the length of the image or along a suitable curve.

In various embodiments, it can be desirable to select a stitching line 520 at a position where the stitching of images will be least noticeable if any stitching errors occur. For example, referring to FIG. 11, in an image 610 that includes a plurality of buildings 611A, 611B, 611C, 611D, sky 615 and vegetation 613, it can be desirable to select a stitching position in areas that are highly irregular and/or highly uniform but that do not include areas with repetitive patterns or straight lines where stitching errors would be more noticeable.

Figure 11:
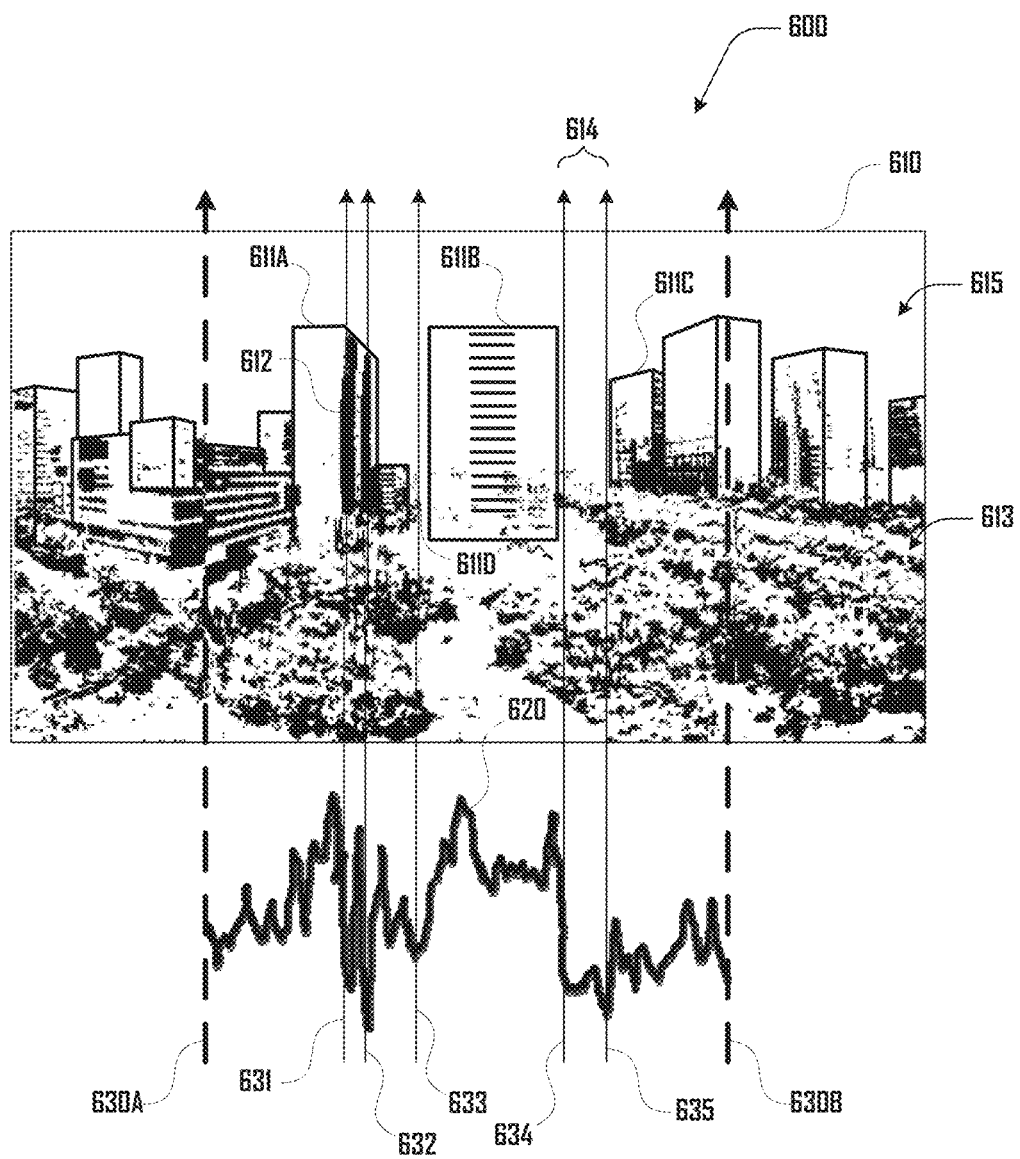
FIG. 11 illustrates an image of an exemplary landscape and a graph of a plurality of stitching quality measures corresponding to potential vertical line stitching positions on within the image.

In various embodiments, a range of stitching positions can be analyzed for a given image, and one or more desirable stitching position can be selected based on such an analysis. For example, FIG. 11 depicts a graph of stitching position analysis data 620, where each point of the position analysis data 620 corresponds to the potential vertical stitching point coincident with that point. The position analysis data 620 corresponds to a portion of the image 610 within boundaries 630A, 630B.

The position analysis data 620 in this example includes peaks that correspond to areas where stitching would be less-desirable and valleys where stitching would be more desirable. For example, stitching positions 631, 632 correspond with respective valleys in the position analysis data 620 and also correspond to a vertical section that extends through shadows 612 of building 611A, vegetation 613 and sky 615. The corresponding valleys in position analysis data 620 indicate that these stitching positions 631, 632 would be more desirable prospective stitching positions compared to other surrounding stitching positions. In this example, a stitching position that extends through shadows 612 of building 611A, vegetation 613 and sky 615 can be desirable because stitching errors would be masked in each of the shadows 612 of building 611A, vegetation 613 and sky 615. In other words, the stitching errors would be less visible because of the random nature of vegetation 613, because of the uniform dark color and irregular shape of shadows 612 and because of the relative consistency of sky 615.

In another example, stitching position 633 also corresponds to a valley in position analysis data 620 compared to adjacent stitching positions. Here, stitching position 633 is between buildings 611D and 611B and primarily extends through a portion of the image 610 occupied by sky 615 and vegetation 613. A stitching position that extends through vegetation 613 and sky 615 can be desirable because stitching errors would be masked in each of the vegetation 613 and sky 615; whereas, stitching errors would be more visible if a stitching position included a portion of buildings 611D, 611B. In other words, the stitching errors would be less visible because of the random nature of vegetation 613 and because of the relative consistency of sky 615. On the other hand, the patterned nature of buildings 611D, 611B, and straight lines of buildings 611D, 611B would be more likely to make stitching errors more visible because broken patterns and broken lines would likely be more visible to an observer.

Similarly, stitching positions in portion 614 of the image 610, between stitching positions 634 and 635 also correspond to a valley in position analysis data 620. Here, stitching positions 614 are between buildings 611B and 611C and primarily extend through a portion of the image 610 occupied by sky 615 and vegetation 613. A stitching position that extends through vegetation 613 and sky 615 can be desirable because stitching errors would be masked in each of the vegetation 613 and sky 615, whereas stitching errors would be more visible if a stitching position included a portion of buildings 611B, 611C. In other words, the stitching errors would be less visible because of the random nature of vegetation 613 and because of the relative consistency of sky 615. On the other hand, the patterned nature of buildings 611B, 611C and straight lines of buildings 611B, 611C would be more likely to make stitching errors more visible because broken patterns and broken lines would likely be more visible to an observer.

Stitching positions can be ranked based on any suitable criteria, including randomness of the surrounding area (e.g., color and/or texture), uniformity of the surrounding area (e.g., color and/or texture), presence of patterns, presence uniform lines or curves, or the like. Images can be preprocessed before stitching position analysis, including converting an image to binary, modifying the color of the image (e.g., conversion to L*a*b color space), dilation and/or erosion, opening and/or closing, application of one or more texture filter, deblurring, object identification, feature detection, image segmentation, edge detection, application of a morphological operator, thresholding, modification of contrast and/or brightness, histogram equalization, application of a geometric transform, and the like.

In one embodiment stitching a first and second image (e.g., images 505, 510 of FIGS. 8 and 9) can comprise automatically cutting the second image to match the first image, which can be a previously assembled image or an initial image that is not a composite of images. A Features from Accelerates Segment Test algorithm (FAST algorithm) can be used for corner detection in the images to identify one or more special characteristic point. A Binary Robust Independent Elementary Features algorithm (BRIEF algorithm) can be used to identify feature descriptors of the image. Hamming distance between the identified descriptors of the two images can be used to identify an overlapping region of the first and second image.

Optimal stitching line, position or column can be identified in various suitable ways. One suitable method includes a combined minimal pixel and gradient least-sum-of-squares calculation. For example, let the pixels in the region of overlap between two images be $P_{1i,j}$ and $P_{2i,j}$. A Sobel operator can be used to respectively determine the magnitude of the gradients $G_{1i,j}$ and $G_{2i,j}$ of the overlapping regions of the two images, as follows:

$G_x = P * H_x$
$G_y = P * H_y$
$G = \sqrt{(G_x^2 + G_y^2)}$ where:

$$H_x = \begin{bmatrix} -1 & -2 & -1 \\ 0 & 0 & 0 \\ 1 & 2 & 1 \end{bmatrix}$$

$$H_y = \begin{bmatrix} -1 & 0 & 1 \\ -2 & 0 & 2 \\ -1 & 0 & 1 \end{bmatrix}$$

The overlapping region's joint pixel and gradient squared differences can be computed as follows:

$SD_{i,j} = (P_{1i,j} - P_{2i,j})^2 + \alpha(G_{1i,j} - G_{2i,j})^2$ where $\alpha$ is the weighting factor.

Here, lots of other situations could also be considered in real world. For example, considering the presence of horizontal lines or curves, the SD function could be changed as follows:

If $G > TH$ (a fixed threshold) and $\arctan\left(\frac{Gx}{Gy}\right) \in [-30°, 30°]$ $$SDi, j = (P_{1i,j} - P_{2i,j})^2 + \alpha(G_{1i,j} - G_{2i,j})^2 + \beta \sum_j \delta(G - TH) \times \left( \frac{1}{\sqrt{3}} - \left| \frac{Gx}{Gy} \right| \right)$$

where $$\delta(G - TH) = \begin{cases} 1 \text{ if } G > TH \\ 0 \text{ if } G \leq TH \end{cases} \text{ and } \beta \text{ is the weighting factor.}$$

And the SD function could optionally include more situations to be considered by adding more corresponding equations.

A sum of squared differences for each column of the overlap region can be computed as follows:

$$SSD_j = \sum_i SD_{i,j}$$

In some embodiments, the stitching column with the minimum or lowest Sum of Squared Differences (SSD) can be selected as the optimal stitching column (i.e., min(SSD$_j$)).

However, in further embodiments, least joint sum of squared differences within a region can be used to select the stitching position as well. For example, begin by dividing the overlapping region into n small regions (e.g., each small region can have 10 columns, etc.), and then respectively compute the joint sum of SSD for each small region:

$$SSSD_k = \sum_{j=10(k-1)+1}^{10k} SSD_j$$

The region having least sum (min(SSSD$_k$)) can then be selected as the optimal stitching region, where the smallest column in this selected region would be chosen as the stitching column.

Accordingly, in some embodiments, SSSD (Substitute SSD) considers the total difference between the gradients, with a focus on the horizontal gradients, along the vertical axis. This can be desirable so as to avoid a stitching seam or stitching errors appearing at such horizontal lines and edges. Avoiding a stitching seam or stitching errors appearing at such horizontal lines and edges can be desirable because a stitching seam or stitching errors can be less apparent to a viewer if located at a location without or with fewer horizontal lines and/or edges.

Identified minimum of SSD, SSSD, or the like (e.g., min(SSD$_j$) or min(SSSD$_k$)) can be compared to a threshold and used to determine the turning rate or turning angle of the aerial vehicle 110 as subsequent images are captured. If the smallest error value is less than this threshold, then a turning rate or angle of the aerial vehicle can be increased. However, if the smallest error value is greater than this threshold, then the turning rate or angle of the aerial vehicle can be decreased.

Figure 12:
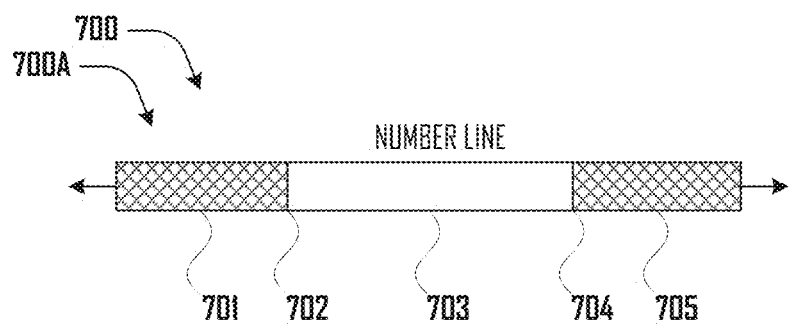
FIG. 12 illustrates a threshold defined by a range of values on a number line.
Figure 13:
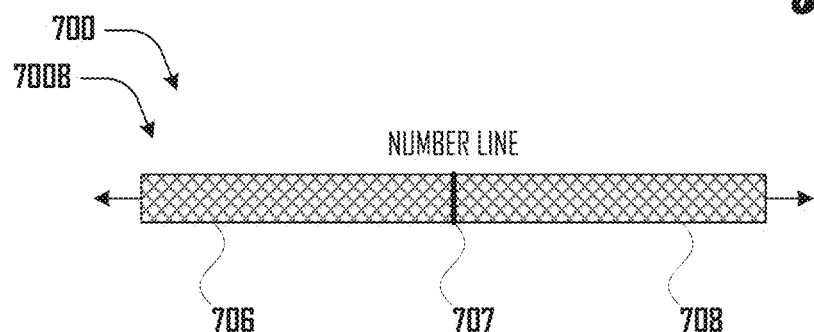
FIG. 13 illustrates a threshold defined by a single value on a number line.

As depicted in FIGS. 12 and 13 respectively, a threshold range 703 can be defined by a range of values between a first and second value 702, 704, with a first set of values 701 below the threshold range 703 and a second set of values 705 above the threshold range 703. Alternatively, a threshold 707 can be a single value, with a range of values 706 below the threshold value 707 and a range of values 708 above the threshold value 707. A threshold value or range can be experimentally determined and defined, and can be changed based on desired image quality.

Using min(SSD$_j$), min(SSSD$_k$), or the like, as feedback for determining rotation rate or angle can be desirable because it can increase the quality of panoramic images generated by a rotating aerial vehicle 110 (shown in FIG. 1) as discussed herein.

For example, referring to FIGS. 5, 6, 8, 9 and 10 the size of image overlap 515 depends on how much the aerial vehicle 110 moves or rotates between successive image capture locations 305. If the aerial vehicle 110 rotates or otherwise moves by a small distance, then the overlap 515 will be larger than if the aerial vehicle 110 rotates or otherwise moves by a larger distance. A larger overlap portion 515 provides a greater number of options for stitching locations, and therefore can increase the chances of finding a lower min(SSD$_j$), min(SSSD$_k$), or the like, compared to when the overlap portion is small.

It can be desirable to generate panoramic images as fast as possible but without sacrificing image quality. Additionally, it can be desirable to generate high quality panoramic images as quickly as possible in a wide range of visual environments. In some visual environments it can be easier to find stitching locations that provide desired panoramic image quality, and therefore a large image overlap 515 may not be necessary. Accordingly, a larger angle between captured images (and therefore smaller image overlap 515) can be suitable, which can speed up the process of generating a panoramic image.

In other visual environments it may be harder to find stitching locations that provide desired panoramic image quality and therefore a large image overlap 515 may be necessary to provide a suitable number of stitching location options. Accordingly, a smaller angle between captured images (and therefore larger image overlap 515) can be suitable, which can slow down the process of generating a panoramic image, but increase the quality of the resulting panoramic image.

Additionally, because the visual environments can change substantially as images are being captured, it can be necessary to increase and/or decrease the rotation angle while generating a panoramic image so as to maximize speed without sacrificing quality of the resulting panoramic image.

Figure 14:
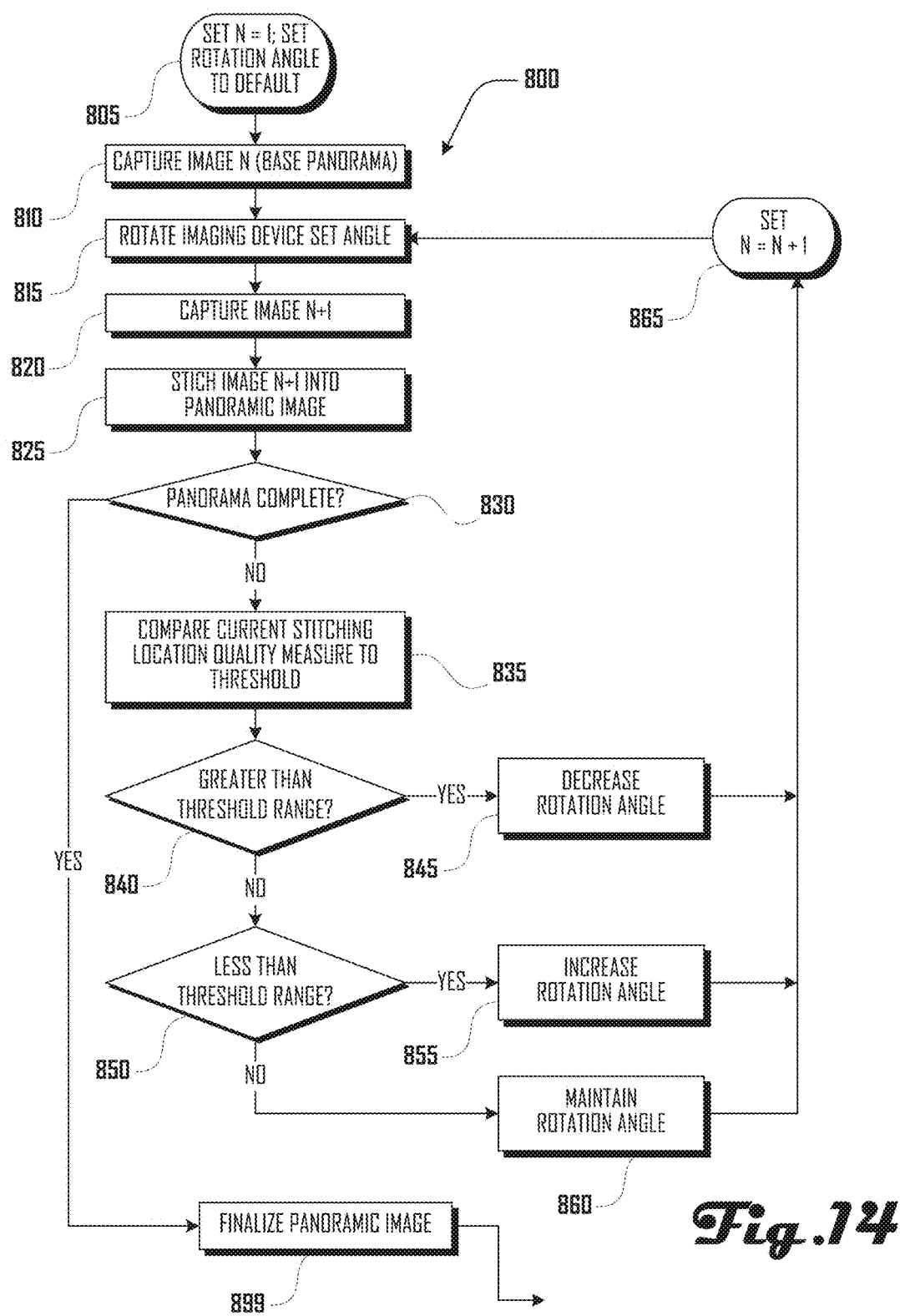
FIG. 14 illustrates an embodiment of a method of adaptive panoramic image generation in accordance with an embodiment.

FIG. 14 depicts a method 800 of using stitching location quality feedback to generate a panoramic image in accordance with one embodiment. The method 800 begins, at 805, where variable N is set to 1 and rotation angle is set to a default value. For example, referring to FIGS. 5 and 6, rotation angle can refer to an angle such as θ, including θ$_{1A}$, θ$_{2A}$, θ$_{1B}$, θ$_{2B}$, or the like. In other words, rotation angle can refer to the angle that the aerial vehicle 110 and/or imaging device 111 moves or rotates between successive image capturing events. One or more default value can be determined experimentally and can be set based on desired speed and/or panoramic image quality settings. For example, if a user desires to capture a panoramic image quickly with less concern for the quality of the panoramic image, then the default setting can be a larger angle θ, compared to a default angle setting for maximizing panoramic image quality regardless of image capture speed.

At block 810, Image N is captured (i.e., Image 1), which is the first or base image of a panoramic image. At block 815, the imaging device 111 (and/or aerial vehicle 110) rotates the set angle. For example, the rotation angle can be the default value defined at 805, or can be a larger or smaller value as described herein. At 820, image N+1 is captured. For example, after base Image 1 is captured, then the next image captured would be Image 2. At block 825, image N+1 is stitched into the existing panoramic image. For example, if base panorama Image 1 is present, then Images 1 and 2 are stitched together to generate a panoramic image. However, if a plurality of images have already been stitched together, as discussed herein, image N+1 is stitched into this panoramic image to further extend the panorama. For example if Images 1 and 2 have been stitched together to form a panoramic image, then image N+1 (i.e., Image 3) will be stitched together with the panoramic image comprising Images 1 and 2.

At decision block 830, a determination is made whether the panoramic image is complete. For example, in various embodiments, an instruction to obtain a panoramic image can include a total rotation that the aerial vehicle 110 and/or imaging device 111 (e.g., 180°, 270°, 360°, or the like). In such an embodiment, a determination of whether the panoramic image is complete can include a determination of the current total rotation from the first captured image compared to the defined total rotation.

If the panoramic image is determined to be complete, then the method 800 continues to block 899, where the panoramic image is finalized. However, if the panoramic image is determined to not be complete, then the method 800 continues to block 835, where a stitching location quality measure is compared to a threshold. For example, as discussed herein, stitching of a first and second image can include identification of a $\min(SSD_j)$, $\min(SSSD_k)$, or other measure of the quality of the selected stitching location. As discussed herein, the threshold can be a value based on desired image quality of a panoramic image.

In decision block 840, a determination is made whether the current quality measure value is greater than the threshold range or value (See, e.g., FIGS. 12 and 13). If the current quality measure value is greater than the threshold range or value, then in block 845, the rotation angle setting is decreased. However, if the current quality measure value is not greater than the threshold range or value, then in decision block 850, a determination is made whether the current quality measure value is less than the threshold range or value. If the current quality measure value is less than the threshold range or value, then in block 855, the rotation angle setting is increased. However, if the current quality measure value is not less than the threshold range or value, then in block 860, the rotation angle setting is maintained (i.e., not changed).

If the rotation angle setting is increased, decreased or maintained, the method 800 continues, to 865, where the N variable is set to N+1. In other words, the value of N is increased by 1. The method 800 then cycles back, to block 815, where the imaging device 111 and/or aerial vehicle 110 rotates or moves the set angle.

Accordingly, the method 800 can provide for capturing a series of images in sequential positions of a movement or rotation pattern of the imaging device 111 and/or aerial vehicle 110. The images are stitched together while moving from one position to another to form a panoramic image. Each successive position of the rotation pattern can be determined in real-time based on data related to stitching of images together. As discussed herein, the angle or amount of movement between successive image capture positions can be based on the quality of a most recent image stitching column, however, in further embodiments, the angle or amount of movement between successive image capture positions can be based on analysis of the resulting panoramic image, analysis of one or more captured image, analysis of environmental conditions, or the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, any of the steps or actions described herein can be performed automatically without user interaction, or can be performed with or based on user interaction or instruction.

What is claimed is:

1. An image generating system, comprising:
   an imaging device configured to capture a first image at a first image capture position and a second image at a second image capture position;
   a processor operably coupled with the imaging device, the processor configured to determine a stitching position quality measure for a plurality of stitching positions in an overlapping portion of the first image and the second image; and
   a controller configured to move the imaging device from the first image capture position to the second image capture position by at least one of: moving the image device along a preselected axis, performing a translation moving of the image device, or moving the image device along a non-uniform path,
   wherein the processor is further configured to:
   select a stitching position based on the determined stitching position quality measures of the plurality of stitching positions of the first and second images, comprising:
   dividing the overlapping portion into overlapping sub-portions;
   calculating a joint sum of squared differences for each of the overlapping sub-portions;
   selecting one of the overlapping sub-portions having a least joint sum; and
   selecting, among a plurality of stitching positions within the selected overlapping sub-portion, a stitching position having a minimal combined pixel and gradient least-sum-of-squared differences, with a minimum sum of squared difference as the stitching position for stitching the first and second images together to generate a panoramic image; and
   stitch the first and second images together at the selected stitching position to generate the panoramic image.

2. The system of claim 1, wherein the stitching position is selected based on a combined minimal pixel and gradient least-sum-of-squares calculation.

3. The system of claim 1, wherein:
   the stitching position is a first stitching position and the panoramic image is a first panoramic image, and
   the processor is further configured to:
   receive a third image captured at a third image capture position;
   identify an overlapping portion of the first panoramic image and the third image;
   determine a stitching position quality measure for a plurality of stitching positions in the overlapping portion of the first panoramic image and the third image;
   select a second stitching position based on the determined stitching position quality measures of the plurality of stitching positions of the first panoramic image and the third image;

stitch the first panoramic image and third image together at the second selected stitching position to generate a second panoramic image; and determine a fourth image capture position based on the stitching position quality measure of the second selected stitching position used to generate the second panoramic image.

4. The system of claim 3, wherein the processor is further configured to determine whether the stitching position quality measure of the first selected stitching position is greater than or less than a threshold.

5. The system of claim 4, wherein a distance between the first and second image capture positions is defined by a first angle,
wherein the angle between the second and third image capture positions is defined by a second angle, and
wherein determining the third image capture position comprises determining the second angle.

6. The system of claim 5, wherein:
an angle greater than the first angle is selected for the second angle if the quality measure of the first selected stitching position is less than the threshold,
an angle less than the first angle is selected for the second angle if the quality measure of the first selected stitching position is greater than the threshold, or
an angle equal to the first angle is selected for the second angle if the quality measure of the first selected stitching position is not greater than the threshold and not less than the threshold.

7. The system of claim 1, wherein the preselected axis is selected from at least two axes at different planes.

8. The system of claim 7, wherein the controller is configured to, when moving the image device along the preselected axis, suppress a movement of the imaging device about an axis of at least two axes that is not the preselected axis.

9. A method for image generation, comprising:
capturing, by an imaging device, a first image at a first image capture position;
moving the imaging device to a second image capture position by at least one of: moving the image device along a preselected axis, performing a translation moving of the image device, or moving the image device along a non-uniform path;
capturing, by the imaging device, a second image at the second image capture position;
determining a stitching position quality measure for a plurality of stitching positions in an overlapping portion of a first and second image;
selecting a stitching position based on the determined stitching position quality measures of the plurality of stitching positions of the first and second image, comprising:
dividing the overlapping portion into overlapping sub-portions;
calculating a joint sum of squared differences for each of the overlapping sub-portions;
selecting one of the overlapping sub-portions having a least joint sum; and
selecting, among a plurality of stitching positions within the selected overlapping sub-portion, a stitching position having a minimal combined pixel and gradient least-sum-of-squared differences, with a minimum sum of squared difference as the stitching position for stitching the first and second images together to generate a panoramic image; and
stitching the first and second images together at the selected stitching position to generate a panoramic image.

10. The method of claim 9, wherein selecting the stitching position comprises selecting the stitching position based on a combined minimal pixel and gradient least-sum-of-squares calculation.

11. The method of claim 9,
wherein the stitching position is a first stitching position and the panoramic image is a first panoramic image,
the method further comprising:
obtaining a third image captured at a third image capture position;
identifying an overlapping portion of the first panoramic image and the third image;
determining a stitching position quality measure for a plurality of stitching positions in the overlapping portion of the first panoramic image and the third image;
selecting a second stitching position based on the determined stitching position quality measures of the plurality of stitching positions of the first panoramic image and the third image;
stitching the first panoramic image and the third image together at the second selected stitching position to generate a second panoramic image; and
determining a fourth image capture position based on the stitching position quality measure of the second selected stitching position used to generate the second panoramic image.

12. The method of claim 11, further comprising determining if the stitching position quality measure of the first selected stitching position is greater than or less than a threshold.

13. The method of claim 11, wherein a distance between the first and second image capture positions is defined by a first angle;
wherein the angle between the second and third image capture positions is defined by a second angle, and
wherein determining the third image capture position comprises determining the second angle.

14. The method of claim 13, further comprising:
selecting an angle greater than the first angle for the second angle, if the quality measure of the first selected stitching position is less than the threshold,
selecting an angle less than the first angle for the second angle, if the quality measure of the first selected stitching position is greater than the threshold, or
selecting an angle equal to the first angle for the second angle, if the quality measure of the first selected stitching position is not greater than the threshold and not less than the threshold.

15. The method of claim 9, wherein moving the imaging device to the second image capture position comprises rotating the imaging device about an axis or moving the imaging device about a circumference of a circle.

16. One or more non-transitory machine-readable storage media encoding a computer program product for adaptive panoramic image generation, the computer program product comprising instructions for executing the method of claim 9.

* * * * *